Patented Nov. 3, 1942

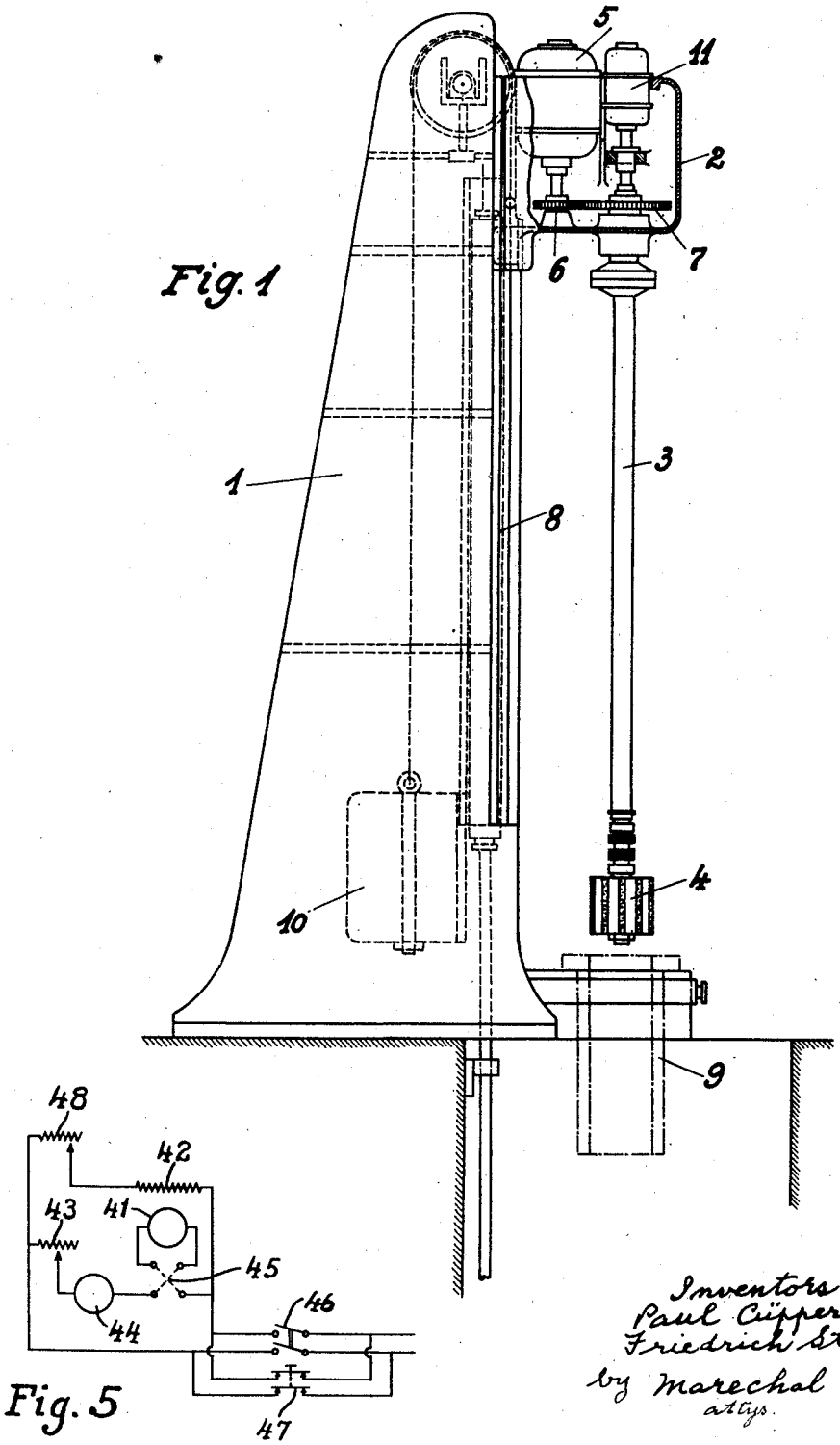

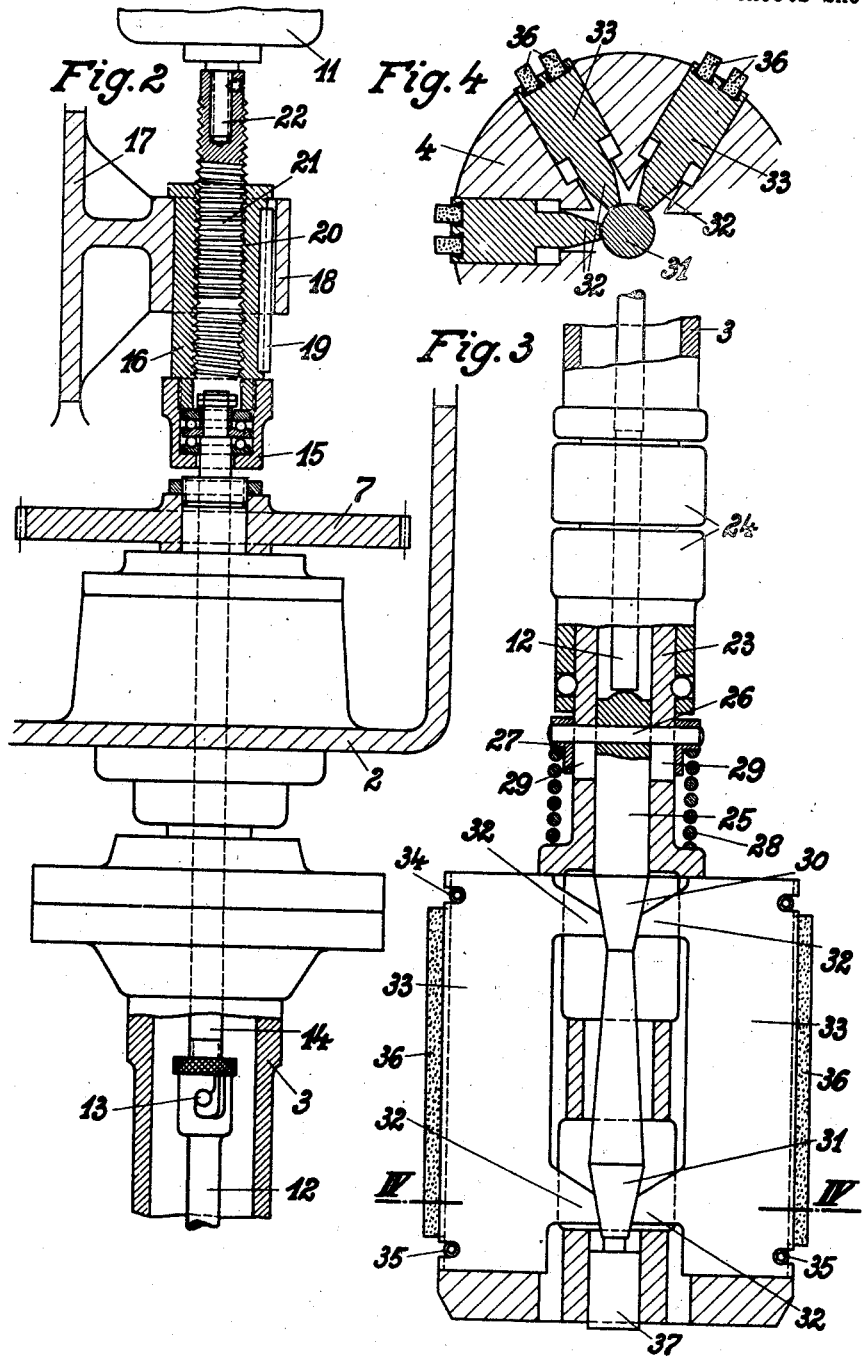

2,301,111

UNITED STATES PATENT OFFICE 2,301,111

GRINDING APPARATUS

Paul Cüppers and Friedrich Stein, Augsburg, Germany; vested in the Alien Property Custodian Application January 4, 1939, Serial No. 249,258
In Germany January 5, 1938

9 Claims. (Cl. 51—184.3)

This invention relates to grinding or finishing apparatus for grinding a cylindrical passage in a work piece.

One object of the invention is the provision of grinding apparatus including a rotatable grinder head having a series of adjustable grinding members, the construction being such that the grinding members are adjusted outwardly by power actuated means which applies a predetermined outward force to the grinding members.

Another object of the invention is the provision of an apparatus of the character mentioned in which the grinding members are adjusted outwardly by a variable torque electric motor which is so controlled that the grinding members may be adjusted to a desired degree and then maintained in that position while the high parts of the work are ground, and so that the grinding members may be urged outwardly with a predetermined pressure during continued operation.

Another object of the invention is the provision of grinding apparatus for grinding a cylindrical passage in a work piece, in which the grinding members are adjustable in the grinder head by an axially movable cam means, axial movements of which are controlled by an axially movable member having a threaded connection to the rotatable shaft of a variable torque electric motor.

Other objects and advantages of the invention will be apparent from the following description, the appended claims, and the accompanying drawings, in which:

Fig. 1 is a side elevation of a grinding apparatus embodying the present invention, part of the wall of the drive housing being removed;

Fig. 2 is a side elevation, partly in section, showing a part of the hollow drive spindle;

Fig. 3 is a longitudinal section through the lower part of the drive spindle and through the grinder head;

Fig. 4 is a sectional view through the grinder head taken on the line 4—4 of Fig. 3; and Fig. 5 is a diagrammatic view of the electrical connections of the adjusting motor.

Referring more particularly to the drawings by reference numerals, the pedestal 1 of the grinding apparatus supports a box-like housing 2 which is vertically movable along the slideway 8 by means of a suitable electric or hydraulic operating mechanism. The weight of the housing 2 and the parts supported thereby are counterbalanced by a weight 10 connected to a cable operable over a pulley and connected at one end to the housing 2. The housing 2 forms a support for the hollow drive spindle 3 which carries the rotatable grinder head 4, and also supports an electric motor 5 which rotates the drive spindle and grinder head through gearing 6 and 7. Adjacent the motor 5 in the housing 2 is a variable torque electric motor 11 constituting a power means for adjusting the grinding stones in the grinder head, the mechanical connection between the adjusting motor 11 and the grinding stones being located axially within the drive spindle 3 as will be presently described.

As shown in Fig. 2, in which a portion of the housing 2 is indicated, the hollow drive spindle 3 encloses an axially movable thrust rod 12 which is connected to an upper rod 14 by means of a suitable coupling 13. At its upper end, the rod 14 is rotatably mounted in antifriction bearings contained in a shell 15 which is secured by screw threads on the lower end of a sleeve 16. The sleeve 16 is axially movable in a bearing bracket 18 carried by the housing but is prevented from rotating in the bearing bracket by means of a tapered key 19 which fits in cooperating grooves in the bracket and sleeve. The sleeve 16 is provided with interior threads 20, engaged with the threads on a plug 21 which is rigidly secured to the stub end 22 of the rotatable armature of adjusting motor 11. When the motor shaft turns, since the sleeve 16 is held against rotation, the sleeve will be moved axially dependent upon the direction of rotation of the motor, and an endwise movement of the rods 14 and 12 will be produced. Moreover the axial thrust applied to the rods 14 and 12 will be proportional to the rotational torque of the motor shaft.

As will be apparent from Figs. 2 and 4 inclusive, the hollow drive spindle 3, which is fixed to and rotated by the gear 7, is provided at its lower end with a sheath 24 which encloses and is secured to the tubular portion 23 of the grinder head 4. The tubular portion 23 surrounds and guides the upper end of an adjusting cam bolt 25 which abuts against the lower end of the axially movable thrust rod 12 so that when the rod 12 is moved downwardly it moves the cam bolt downwardly. The cam bolt 25 is fixed to a transverse pin 26 which projects into a collar or plate 27 slidable on the tubular portion 23 and engaged by spring 28. The lower end of this spring engages a flanged portion of the grinder head, so that the spring acts to yieldingly urge the cam bolt upwardly. Vertical slots 29 in the tubular portion 23 provide for vertical movement of the pin 26, which is effective in restraining the cam bolt from rotation in the grinder head.

The downward movement of the cam bolt depresses the conical cam surfaces 30 and 31 which engage the tapered cam ends 32 of the grinding stone holders 33 so that the grinding stone holders are moved outwardly and preferably in a radial direction against the restraining action of the spring rings 34 and 35 which normally act to hold the grinding members in their retracted positions. Suitable grinding stones 36 are secured in the outer portions of the holders 33. The lower end of the cam means 25 is guided in the grinder head by means of the cylindrical extension 37.

In accordance with the present invention, the grinding members are radially adjustable in the grinder head by means of a power actuated means which applies a predetermined outward force on the grinding members. The power actuation of the grinding members, in adjusting the same, is effected by the variable torque electric motor 11 capable of exerting different known torques even when the motor shaft is stationary, and such that it may be maintained energized without harm when the force against which the motor acts is such as to hold the motor armature stationary. Such a motor is illustrated diagrammatically in Fig. 5, in which the armature of the motor 11 is designated by reference numeral 41, and the field winding at 42. Suitable means are provided for the control of the motor torque, such as the adjustable resistances 43 and 48, and means such as the instrument or ammeter 44 gives an indication of the motor torque at any time. The reversing switch 45 provides for reversing the direction of rotation of the motor shaft. Power is supplied from a suitable source either through a switch 46 providing for continued energization of the motor or through a push button type of switch 47 which permits temporary energization of the motor for short intervals under the control of the operator.

The operation of the apparatus is as follows.

Before starting to grind a cylindrical passage in a work piece, the work piece is measured or tested to determine whether the passage in question is not truly cylindrical and should be ground to provide an accurate cylindrical formation, or whether it requires only a finishing grinding cut. If the passage to be ground is not perfectly cylindrical, and a cylindrical form must first be established by the grinding operation, the grinder head is lowered and applied to the passage in the work piece which is held in a suitable carrier, and the required torque of the motor 11 determined from the nature of the material being worked on and the number of grinding stones utilized in the grinder head. With the required setting of the torque varying means or resistances 43 and 48, the grinding stones are then set or adjusted in the grinder head by energizing the motor 11 through the push button type of switch 47. The motor 11 thus rotates the threaded plug 21 to axially move the sleeve 16 and thrust the rods 14 and 12 downwardly with a predetermined thrust force against the action of the spring 28 until the grinding stones are moved radially outwardly far enough to lie against the wall of the passage to be ground. Their outward movement will stop, stopping the motor armature, as soon as the portions of the passage of smallest diameter are engaged with the grinding stones, and the desired predetermined pressure is exerted against the smaller portions of the passage, the grinding stones being held against inward or retracting movement until the motor is reversed since the threads 20 prevent the sleeve 16 from reversely rotating the plug 21. This operation of motor 11 takes place preferably at a time when motor 5 is deenergized so that the stones will not be moved out far enough to engage the portions of the passage of largest diameter, which might result in the application of an excessive or stalling force on motor 5. The motor 11 is then deenergized and the motor 5 which rotates the grinding head is started. The grinding stones will thus engage the high portions, that is, the portions of the passage in which the diameter is the smallest and those portions will be ground down although no material is removed at this time from the portions of the passage where the diameter is greatest. After a suitable time of operation, a further outward adjustment of the grinding stones is produced in the same way, or by temporarily and for only a very short time energizing the switch 47 while the motor 5 is running. Gradually the high portions of the passage are ground down without removing any substantial quantity of material from the parts of the passage where the diameter is greatest until a sufficiently exact cylindrical form is produced.

After the passage has been made truly cylindrical and during the continued operation of the motor 5, the switch 46 may then be closed so that the grinding stones are held in engagement with the passage in the work piece with a predetermined pressure, in accordance with the torque setting of the motor 11, as the grinding action proceeds and the final or finishing grinding operation is then completed, producing a smooth surface on the entire passage.

Since the grinding stones are moved outwardly by a power actuated means such as the variable torque electric motor, the pressure of the stones against the work piece may be readily varied at any time and may be exactly determined without requiring the operator to determine the pressure by judging the pressure by the sense of feeling. Since the motor 11 may be operated intermittently the initial grinding action can be such as to give a precise cylindrical form to the passage in case the form of the work piece is not truly cylindrical to start with, and this may be followed immediately by the final grinding action in which all parts of the passage are finished.

After the grinding operation on the passage is completed, the grinding stones may be moved radially inwardly by reversing the operation of the motor 11, through the reversing switch 43. The motor then moves the sleeve 16 upwardly, and the cam plunger 25 is retracted upwardly by the spring 28, the grinding stones being moved inwardly by the ring springs 34 and 35.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for grinding a cylindrical passage in a work piece comprising a rotatable grinder head having a series of outwardly adjustable grinding members, means for rotating the grinding head, mechanism operable to adjust said members outwardly, a variable torque electric motor having a connection to said mechanism for applying a predetermined outward force on said grinding members, and means for varying the torque of the motor.

2. Apparatus for grinding a cylindrical passage in a work piece comprising a rotatable grinder head having a series of outwardly adjustable grinding members, means for rotating the grinding head, mechanism operable to adjust said members outwardly, a variable torque electric motor having a connection to said mechanism for applying a predetermined outward force on said grinding members, means for varying the torque of the motor, switch means operable to provide a continued energization of the motor, and additional switch means for temporarily energizing the motor.

3. Apparatus for grinding a cylindrical passage in a work piece comprising a rotatable grinder head having a series of outwardly adjustable grinding members, means for rotating the grinding head, mechanism operable to adjust said members outwardly, a variable torque electric motor having a connection to said mechanism for maintaining a predetermined outward force on said grinding members, and means for indicating the torque of the motor.

4. Apparatus for grinding a cylindrical passage in a work piece comprising a grinder head having a series of outwardly adjustable grinding members, means for rotating the grinder head, cam means operable longitudinally in the grinder head for radially adjusting the grinding members in said head, an axially movable member for moving said cam means, a variable torque electric motor, and means rotated by said motor and having a threaded engagement with said axially movable member for applying an endwise thrust on said cam means proportionate to the torque of the motor.

5. Apparatus for grinding a cylindrical passage in a work piece comprising a grinder head having a series of outwardly adjustable grinding members, means for rotating the grinder head, cam means operable longitudinally in the grinder head for radially adjusting the grinding members in said head, spring means for urging said cam means to a retracted position corresponding to a retracted position of the grinding members, an axially movable member for moving said cam means, a variable torque electric motor, and means rotated by said motor and having a threaded engagement with said axially movable member for applying an endwise thrust on said cam means proportionate to the torque of the motor.

6. Apparatus for grinding a cylindrical passage in a work piece comprising a rotatable grinder head having a series of radially adjustable grinding members, cam means for simultaneously and similarly adjusting said grinding members in said head, a pin guided in said head and extending through said cam means, a spring engaging said head and said pin for urging said cam means to a retracted position, an axially movable rod abutting the end of said cam means, a variable torque motor having a rotatable operated shaft, and means for transforming rotational torque of said shaft into a proportionate endwise thrust of said rod.

7. Apparatus for grinding a cylindrical passage in a work piece comprising a rotatable grinder head having a series of outwardly adjustable grinding members, cam means in operative engagement with said members, means for rotating the grinding head, a variable torque electric motor for applying a predetermined outward force on said grinding members by said cam means, and means for varying the torque of the motor.

8. Apparatus for grinding a cylindrical passage in a workpiece comprising a rotatable grinder head having a series of outwardly adjustable grinding members, cam means in operative engagement with said members, a motor for rotating said grinder head, a variable torque electric motor for applying an outward force on said grinding members by said cam means, means operable to vary the torque of said electric motor, and means for reversing the direction of operation of said electric motor.

9. Apparatus for grinding a cylindrical passage in a workpiece comprising a rotatable grinder head having a series of outwardly adjustable grinding members provided with inwardly facing cam surfaces, a motor for rotating said grinder head, cam means axially movable in said head in engagement with said cam surfaces, a rotatable threaded shaft for operating said cam means, a variable torque electric motor for rotating said shaft to apply an outward force on the grinding members, means for varying the torque of said electric motor, and means for reversing the direction of operation of said electric motor.

PAUL CÜPPERS.
FRIEDRICH STEIN.